(12) United States Patent
Greenspan et al.

(10) Patent No.: US 10,304,418 B2
(45) Date of Patent: May 28, 2019

(54) OPERATING SYSTEM TRANSPARENT SYSTEM MEMORY ABANDONMENT

(71) Applicant: Intel Corporation, Santa Clara, CA (US)

(72) Inventors: Daniel Greenspan, Jerusalem (IL); Randy Osborne, Beaverton, OR (US); Zvika Greenfield, Kfar Sava (IL); Israel Diamand, Aderet (IL); Asaf Rubinstein, Tel-Aviv (IL)

(73) Assignee: Intel Corporation, Santa Clara, CA (US)

( * ) Notice: Subject to any disclaimer, the term of this patent is extended or adjusted under 35 U.S.C. 154(b) by 121 days.

(21) Appl. No.: 15/276,856

(22) Filed: Sep. 27, 2016

(65) Prior Publication Data
US 2018/0089096 A1 Mar. 29, 2018

(51) Int. Cl.
G06F 3/14 (2006.01)
G09G 5/39 (2006.01)
G09G 5/393 (2006.01)
G06F 12/0895 (2016.01)

(52) U.S. Cl.
CPC ........... *G09G 5/39* (2013.01); *G06F 12/0895* (2013.01); *G09G 5/393* (2013.01); *G06F 3/14* (2013.01); *G06F 2212/604* (2013.01); *G09G 2360/121* (2013.01)

(58) Field of Classification Search
None
See application file for complete search history.

(56) References Cited

U.S. PATENT DOCUMENTS

| | | | | |
|---|---|---|---|---|
| 5,907,709 A * | 5/1999 | Cantey | ................ | G06F 11/366 714/E11.211 |
| 6,081,883 A * | 6/2000 | Popelka | .............. | G06F 12/0813 707/E17.01 |
| 8,612,676 B2 | 12/2013 | Dahlen et al. | | |
| 9,448,927 B1 * | 9/2016 | Agarwala | ........... | G06F 12/0253 |
| 2008/0109624 A1 * | 5/2008 | Gilbert | ................ | G06F 12/0284 711/163 |
| 2013/0198434 A1 * | 8/2013 | Mylly | ................ | G06F 12/0246 711/103 |

* cited by examiner

*Primary Examiner* — Jason A Pringle-Parker
(74) *Attorney, Agent, or Firm* — Jordan IP Law, LLC

(57) ABSTRACT

An electronic processing system may include a processor and a multi-level memory coupled to the processor, the multi-level memory including at least a main memory and a fast memory, the fast memory having relatively faster performance as compared to the main memory. The system may further include a fast memory controller coupled to the fast memory and a graphics controller coupled to the fast memory controller. The fast memory may include a cache portion allocated to a cache region to allow a corresponding mapping of elements of the main memory in the cache region, and a graphics portion allocated to a graphics region for the graphics controller with no corresponding mapping of the graphics region with the main memory.

12 Claims, 11 Drawing Sheets

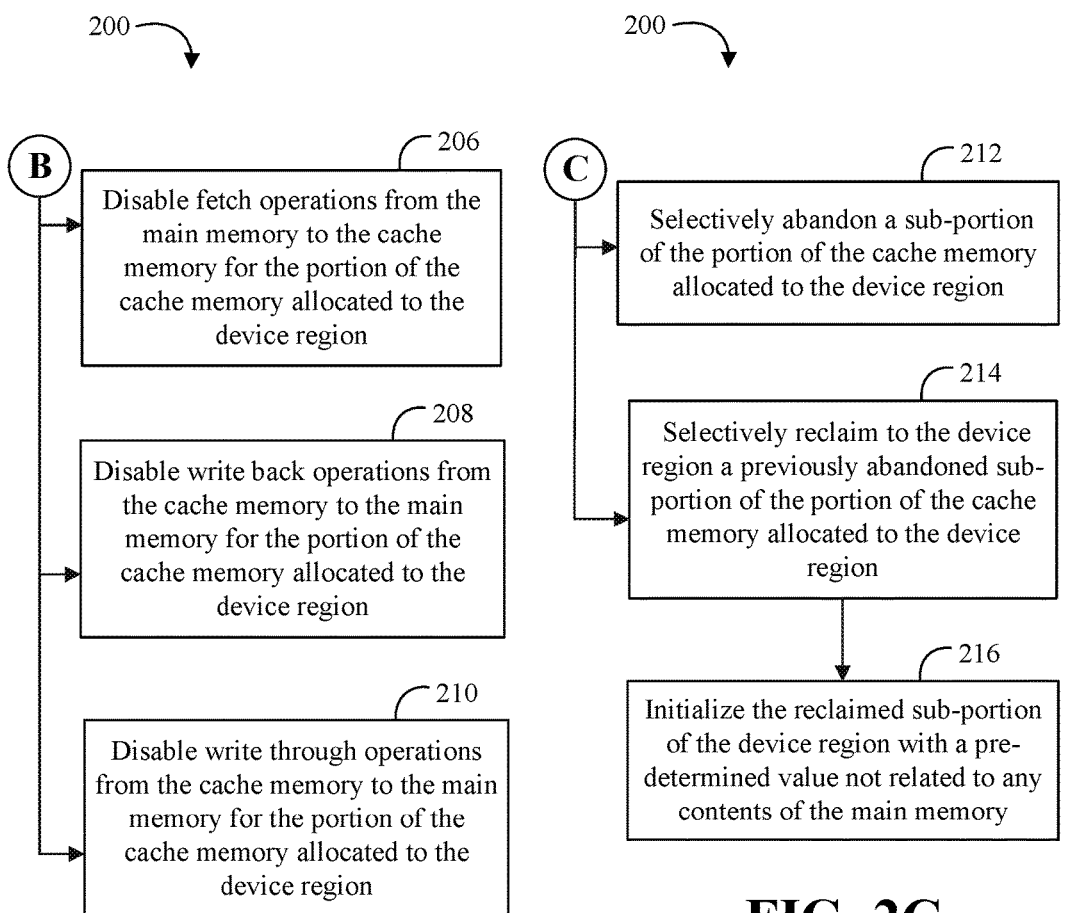

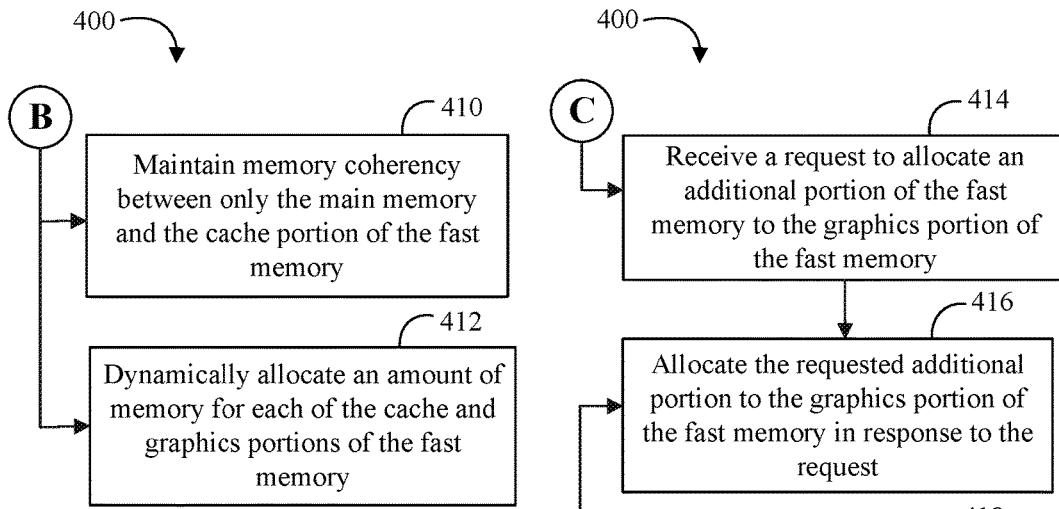
FIG. 4B
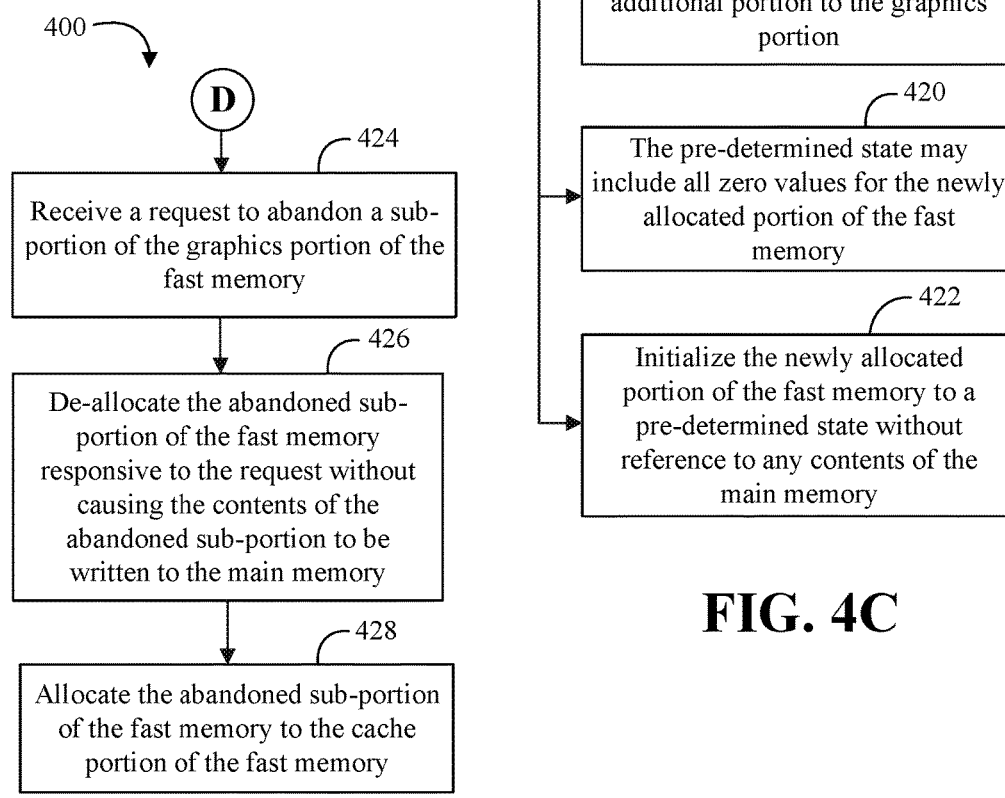
FIG. 4C
FIG. 4D

OPERATING SYSTEM TRANSPARENT SYSTEM MEMORY ABANDONMENT

TECHNICAL FIELD

Embodiments generally relate to device controllers.

BACKGROUND

Memory devices may have different capacity and performance characteristics and corresponding cost differences. An electronic processing system may include a two level memory (2LM) system with a large main memory and a smaller but faster cache memory. In such a two level memory system, it may be the case that memory regions that have been allocated to latency-sensitive operations such as graphics processing are persistently held in the cache memory in order to assure sufficient performance.

BRIEF DESCRIPTION OF THE DRAWINGS

The various advantages of the embodiments will become apparent to one skilled in the art by reading the following specification and appended claims, and by referencing the following drawings, in which:

FIGS. 2A to 2C are flowcharts of an example of a method of controlling a multi-level memory according to an embodiment;

FIGS. 4A to 4D are flowcharts of an example of another method of controlling a multi-level memory system according to an embodiment;

DESCRIPTION OF EMBODIMENTS

Figure 1:
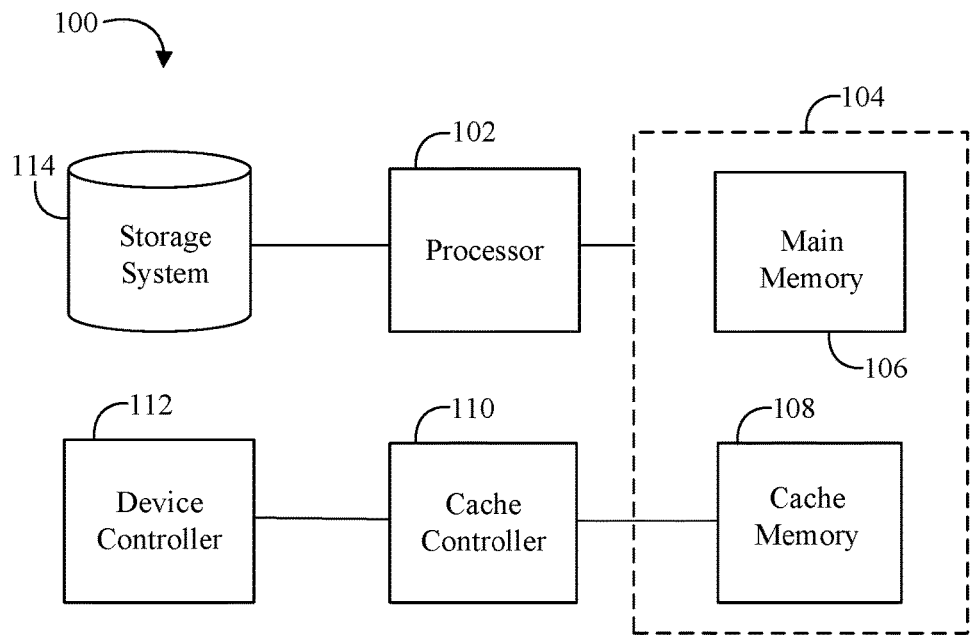
FIG. 1 is a block diagram of an example of an electronic processing system according to an embodiment.

Turning now to FIG. 1, an embodiment of an electronic processing system 100 may include a processor 102 and a multi-level memory 104 coupled to the processor 102. For example, the multi-level memory 104 including at least a main memory 106 and a cache memory 108. The system 100 may further include a cache controller 110 coupled to the cache memory 108, a device controller 112 coupled to the cache controller 110, and a storage system 114 coupled to the processor 102. Advantageously, the storage system 114 may store code which when executed by the processor 102 is to allocate a portion of a cache memory 108 to a device region for the device controller 112 with no corresponding mapping of the device region in the main memory 106, and to disable memory coherency operations between the main memory 106 and the cache memory 108 for the portion of the cache memory allocated to the device region. For example, non-limiting examples of the processor 102 may include a central processing unit (CPU), a general purpose processor, and an application specific processor.

In some embodiments of the system 100, the code may be further to disable fetch operations from the main memory to the cache memory for the portion of the cache memory allocated to the device region. The code may be further to disable write back operations from the cache memory to the main memory for the portion of the cache memory allocated to the device region. The code may be further to disable write through operations from the cache memory to the main memory for the portion of the cache memory allocated to the device region. The code may be further to selectively abandon a sub-portion of the portion of the cache memory allocated to the device region. The code may be further to selectively reclaim to the device region a previously abandoned sub-portion of the portion of the cache memory allocated to the device region. For example, the code may be further to initialize the reclaimed sub-portion of the device region with a pre-determined value not related to any contents of the main memory (e.g. all zero values). For example, the device region may correspond to a device including a graphics device, a high speed disk device, an algorithmic processing device, a cryptographic processing device, or a high speed input output device. For example, a device controller may be any combination of device controller hardware, device controller driver software, and device controller firmware (e.g. firmware may be software that runs on the device controller hardware as opposed to the device controller driver software that may run on a host CPU). Although the device region may correspond to or be associated with a particular device, those skilled in the art will understand that the region itself may be a memory working area servicing the controller for the device.

Figure 2A:
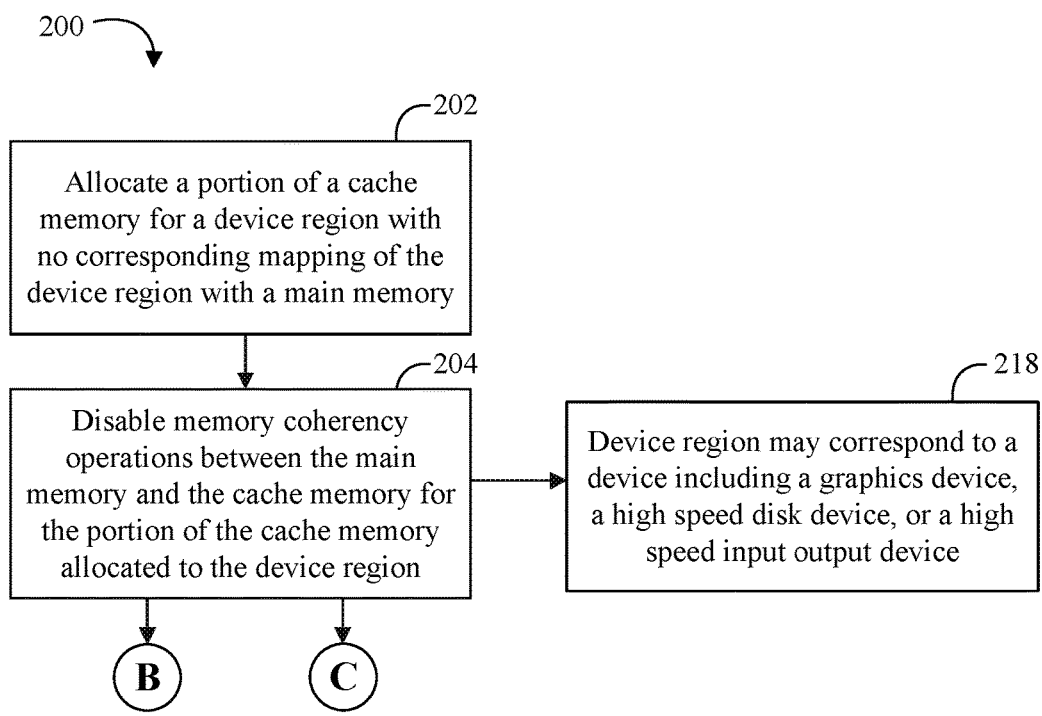

FIGS. 2A to 2C show an embodiment of a method 200 of controlling a multi-level memory system. The method 200 may generally be implemented in an electronic processing system such as, for example, the electronic processing system 100 (FIG. 1), already discussed. More particularly, the method 200 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 200 may be written in any combination of one or more operating system applicable/appropriate programming languages, including an object oriented programming language such as JAVA, SMALLTALK, C++ or the like and conventional procedural programming languages, such as the "C" programming language or similar programming languages.

The method 200 of controlling a multi-level memory may include allocating a portion of a cache memory for a device region with no corresponding mapping of the device region with a main memory at block 202, and disabling memory coherency operations between the main memory and the cache memory for the portion of the cache memory allocated to the device region at block 204. For example, disabling memory coherency operations for the portion of the cache memory allocated to the device region may include disabling fetch operations from the main memory to the cache memory for the portion of the cache memory allocated to the device region at block 206. For example, disabling memory coherency operations for the portion of the cache memory allocated to the device region may include disabling write back operations from the cache memory to the main memory for the portion of the cache memory allocated to the device region at block 208. For example, disabling memory coherency operations for the portion of the cache memory allocated to the device region may include disabling write through operations from the cache memory to the main memory for the portion of the cache memory allocated to the device region at block 210.

For example, some embodiments of the method 200 may further include selectively abandoning a sub-portion of the portion of the cache memory allocated to the device region at block 212, selectively reclaiming to the device region a previously abandoned sub-portion of the portion of the cache memory allocated to the device region at block 214, and/or initializing the reclaimed sub-portion of the device region with a pre-determined value not related to any contents of the main memory at block 216. For example, the device region may correspond to a device including a graphics device, a high speed disk device, an algorithmic processing device, a cryptographic processing device, or a high speed input output device at block 218.

Figure 3:
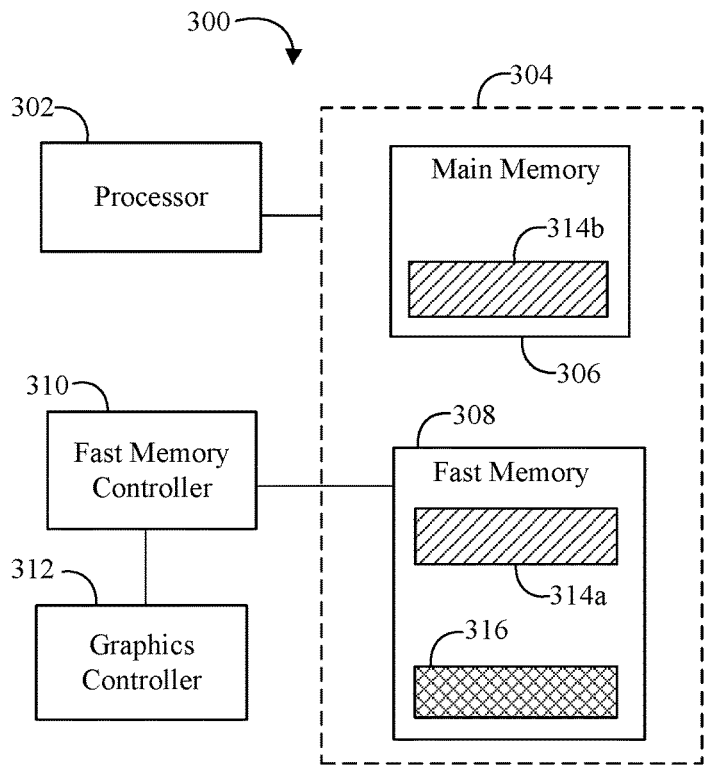
FIG. 3 is a block diagram of an example of another electronic processing system according to an embodiment.
Figure 4A:
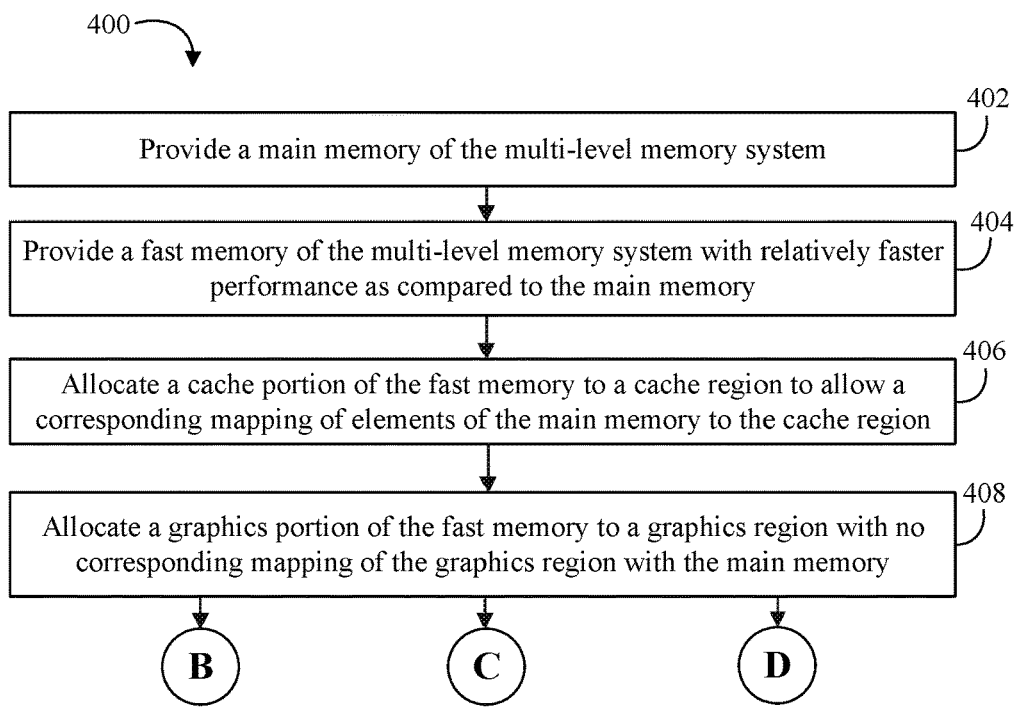

Turning now to FIG. 3, an embodiment of an electronic processing system 300 may include a processor 302 and a multi-level memory 304 coupled to the processor 302. The multi-level memory 304 may include at least a main memory 306 and a fast memory 308, the fast memory 308 having relatively faster performance as compared to the main memory 306. The system 300 may further include a fast memory controller 310 coupled to the fast memory 308 and a graphics controller 312 coupled to the fast memory controller 310. Advantageously some embodiments of the fast memory 308 may include a cache portion 314a allocated to a cache region to allow a corresponding mapping of elements 314b of the main memory 306 in the cache region, and a graphics portion 316 allocated to a graphics region for the graphics controller 312 with no corresponding mapping of the graphics region with the main memory 306. For example, non-limiting examples of the processor 302 may include a central processing unit (CPU), a general purpose processor, and an application specific processor.

In some embodiments of the electronic processing system 300, the fast memory controller 310 may be to maintain memory coherency between only the main memory 306 and the cache portion 314a of the fast memory 308. In some embodiments of the system 300, the fast memory controller 310 may be to dynamically allocate an amount of memory for each of the cache and graphics portions 314a and 316 of the fast memory 308. For example, the fast memory controller 310 may be further to receive a request from the graphics controller 312 to allocate an additional portion of the fast memory 308 to the graphics portion 316 of the fast memory 308, allocate the requested additional portion to the graphics portion 316 of the fast memory 308 in response to the request, and initialize the newly allocated portion of the fast memory 308 to a pre-determined state without reference to any contents of the main memory 306. The pre-determined state may include all zero values for the newly allocated portion of the fast memory 308. In some embodiments of the electronic processing system 300, the fast memory controller 310 may be further to evict cache entries from the cache portion 314a of the fast memory 308 as needed to allocate the requested additional portion to the graphics portion 316.

In some embodiments of the electronic processing system 300, the fast memory controller 310 may be further to receive a request from the graphics controller 312 to abandon a sub-portion of the graphics portion 316 of the fast memory 308, de-allocate the abandoned sub-portion of the fast memory 308 responsive to the request without causing the contents of the abandoned sub-portion to be written back to main memory 306, and allocate the abandoned sub-portion of the fast memory 308 to the cache portion 314a of the fast memory 308. For example, a graphics controller may be any combination of graphics controller hardware, graphics controller driver software, and graphics controller firmware (e.g. firmware may be software that runs on the graphics controller hardware as opposed to the device controller driver software that may run on a host CPU).

FIGS. 4A to 4D show an embodiment of a method 400 of controlling a multi-level memory system. The method 400 may generally be implemented in an electronic processing system such as, for example, the electronic processing system 300 (FIG. 3), already discussed. More particularly, the method 400 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The method 400 of controlling a multi-level memory system may include providing a main memory of the multi-level memory system at block 402, providing a fast memory of the multi-level memory system with relatively faster performance as compared to the main memory at block 404, allocating a cache portion of the fast memory to a cache region to allow a corresponding mapping of elements of the main memory to the cache region at block 406, and allocating a graphics portion of the fast memory to a graphics region with no corresponding mapping of the graphics region with the main memory at block 408.

Some embodiments of the method 400 may further include maintaining memory coherency between only the main memory and the cache portion of the fast memory at block 410. Some embodiments of the method 400 may further include dynamically allocating an amount of memory for each of the cache and graphics portions of the fast memory at block 412.

Some embodiments of the method 400 may further include receiving a request to allocate an additional portion of the fast memory to the graphics portion of the fast memory at block 414, and allocating the requested additional portion to the graphics portion of the fast memory in response to the request at block 416. For example, the method 400 may further include evicting cache entries from the cache portion of the fast memory as needed to allocate the requested additional portion to the graphics portion at block 418. For example, prior to initializing the newly allocated portion of the fast memory, the pre-determined state may include all zero values for the newly allocated portion of the fast memory (at block 420), and the method 400 may further include initializing the newly allocated portion of the fast memory to a pre-determined state without reference to any contents of the main memory at block 422.

Some embodiments of the method 400 may further include receiving a request to abandon a sub-portion of the graphics portion of the fast memory at block 424, de-allocating the abandoned sub-portion of the fast memory responsive to the request without causing the contents of the abandoned sub-portion to be written back to the main memory at block 426 (for instance if they have been changed and thus dirtied), and allocating the abandoned sub-portion of the fast memory to the cache portion of the fast memory at block 428.

Figure 5:
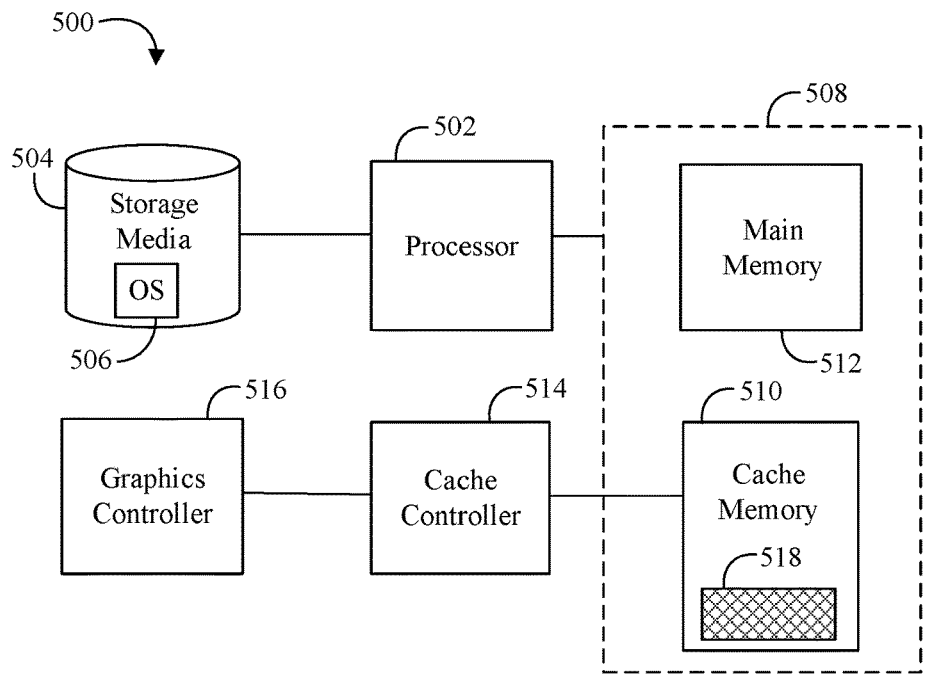
FIG. 5 is a block diagram of an example of another electronic processing system according to an embodiment.

Turning now to FIG. 5, an embodiment of an electronic processing system 500 may include a processor 502 and a persistent storage media 504 coupled to the processor 502. For example, the persistent storage media 504 may store code which when executed by the processor 502 is to provide an operating system (OS) 506 for the electronic processing system 500. The system 500 may further include a multi-level memory system 508 coupled to the processor 502, the multi-level memory system 508 including at least a cache memory 510 and a main memory 512. A cache controller 514 may be coupled to the cache memory 510 and a graphics controller 516 may be coupled to the cache controller 514. Advantageously, in some embodiments the graphics controller 516 may be to request the cache controller 514 to allocate a portion of the cache memory 510 to a graphics region 518 with no corresponding mapping of the graphics region 518 with the main memory 512, and to selectively request the cache controller 514 to abandon a sub-portion of the graphics region 518 in accordance with a graphics operation mode transparent to the OS 506. Advantageously, in some embodiments the cache controller 514 may be to allocate the graphics region 518 in the cache memory 510 in response to the request from the graphics controller 516 transparent to the OS 506, and de-allocate the abandoned sub-portion of the graphics region 518 in response to the request from the graphics controller 516 transparent to the OS 506. For example, non-limiting examples of the processor 502 may include a central processing unit (CPU), a general purpose processor, and an application specific processor.

In some embodiments of the electronic processing system 500, the graphics controller 516 may be further to request the cache controller 514 to reclaim a portion of the cache memory 510 as part of the graphics region 518 of the cache memory 510 transparent to the OS 506, and the cache controller 514 may be further to allocate an additional portion of the cache memory 510 to the graphics region 518 in response to the request from the graphics controller 516. For example, the cache controller 514 may be further to initialize the reclaimed additional portion of the cache memory 510 to a pre-determined state without any reference to any contents of the main memory 512.

Figure 6A:
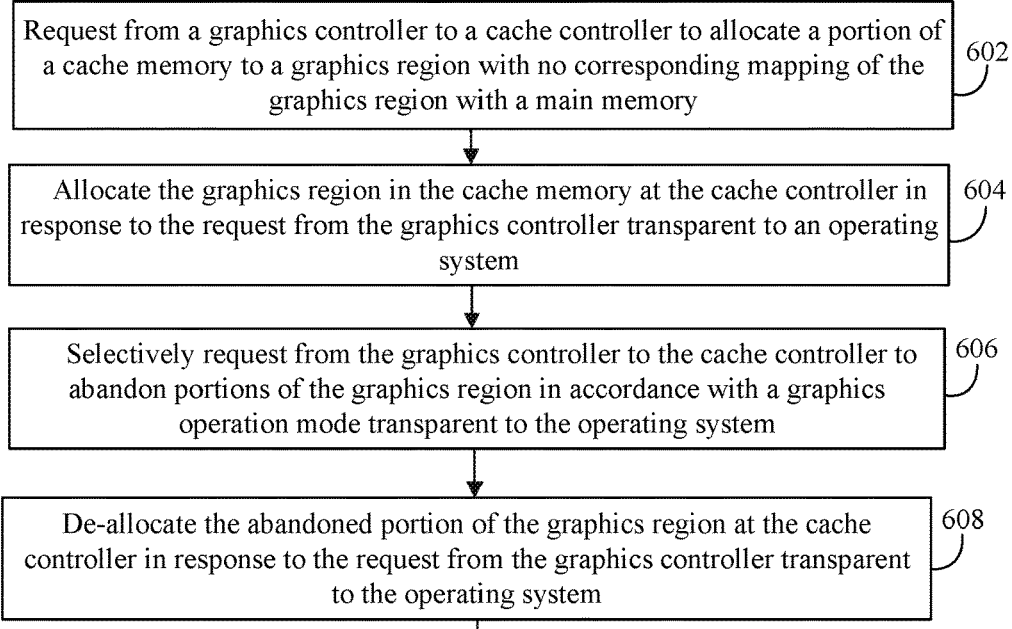
FIGS. 6A and 6B are flowcharts of an example of a method of operating an electronic processing system according to an embodiment.
Figure 6B:
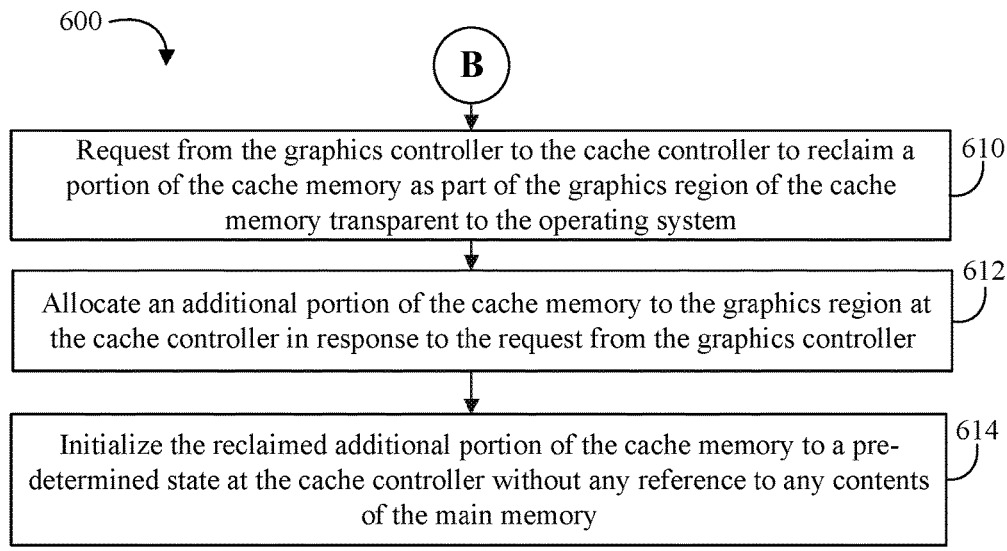

FIGS. 6A to 6B show an embodiment of a method 600 of operating an electronic processing system. The method 600 may generally be implemented in an electronic processing system such as, for example, the electronic processing system 500 (FIG. 5), already discussed. More particularly, the method 600 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The method 600 of operating an electronic processing system may include requesting from a graphics controller to a cache controller to allocate a portion of a cache memory to a graphics region with no corresponding mapping of the graphics region with a main memory at block 602, allocating the graphics region in the cache memory at the cache controller in response to the request from the graphics controller transparent to an operating system at block 604, selectively requesting from the graphics controller to the cache controller to abandon portions of the graphics region in accordance with a graphics operation mode transparent to the operating system at block 606, and de-allocating the abandoned portion of the graphics region at the cache controller in response to the request from the graphics controller transparent to the operating system at block 608.

Some embodiments of the method 600 may further include requesting from the graphics controller to the cache controller to reclaim a portion of the cache memory as part of the graphics region of the cache memory transparent to the operating system at block 610, and allocating an additional portion of the cache memory to the graphics region at the cache controller in response to the request from the graphics controller at block 612. For example, the method 600 may further include initializing the reclaimed additional portion of the cache memory to a pre-determined state at the cache controller without any reference to any contents of the main memory at block 614.

As mentioned above, in a two level memory (2LM) system, it may often be the case that memory regions that have been allocated to latency-sensitive operations such as graphics processing need to be held in near (cache) memory in order to assure sufficient performance. Once the OS has provided such memory regions to the graphics driver, it is only the graphics driver that knows, at any particular time, which parts of the region are being used, and therefore should be persistently held in near memory. The graphics driver may allow a significant boost in overall system performance by releasing unused parts of these regions from near memory, making more near memory available for other tasks. However, the release process, and any subsequent request by the graphics driver for the memory to return to near memory, may cause major system overhead as changed contents may be transferred to far (main) memory during release, and, more critically, read from far memory when returned. Advantageously, some embodiments of an electronic processing system may give the graphics driver, which holds full rights to arbitrarily write any memory that has been allocated to it by the OS, and rights to allow hardware blocks to do so, a mechanism by which it may declare to hardware that it has abandoned a region of memory, allowing hardware to forget its contents and/or overwrite the contents with other values such as all zeros.

Another advantage provided by some embodiments is that the cache controller, on receiving notice of this abandonment, does not attempt to transfer the contents to far memory, but simply destroys the record of the memory region being in near memory. Likewise, when advised by the graphics driver that it wishes to reclaim use of the memory region, the cache controller does not attempt to transfer the contents from far memory, but simply creates a record of the memory region in near memory, filling arbitrary data such as all zero.

Another advantage provided by some embodiments is that, with the addition of a method of assuring that the memory region will be held in near memory at all times except when it has been abandoned, the need to maintain storage for that memory region in far memory is obviated, and thus may effectively increase the amount of far memory available for other tasks. For example, in a conventional system a graphics driver may suffer significant delays whenever it requests a particular region to be held in near memory, impacting performance. As a result, conventional graphics drivers may err on the safe side in requesting near memory resources, which results in more of the graphics memory regions being held in near memory than are necessary for a particular graphics operation or mode. Because near memory is a limited resource, the non-necessary persistent occupation of portions of near memory by a conventional graphics driver may result in serious performance impact to other tasks running on the system. Another problem with conventional systems is that a significant amount of far memory may be allocated to a graphics region, but this region may be mostly or always cached in the cache. Thus, in conventional systems this part of far memory is almost never accessed, but there exists no mechanism of addressing it for use for something else, because the cache would handle any accesses to the graphics region.

Advantageously, graphics and cache controllers in accordance with some embodiments may allow improvements both to graphics performance (e.g. by allowing a liberal allocation of high-performance graphics region memory to graphics) whilst reducing impact to overall system performance (e.g. by ensuring that only the amount of high-performance memory actually needed by graphics is used from near memory). For example, some embodiments may substantially optimize the usage of near memory with respect to the graphics region and also expand the effective size of far memory.

By way of explanation and not limitation, a conventional computer system may have regions of system memory that have different performance characteristics, and where some (or all) of a high-performance region may be earmarked by BIOS for use as a graphics region. The BIOS may describe the graphics region to the OS and the OS may service all requests for memory blocks from the graphics driver with memory from the graphics region. Due to the expectation that the entire graphics region may be used for high-bandwidth accesses with tight latency requirements, BIOS will have locked (or pinned) the graphics region into the cache memory (e.g. a near memory formed by fast Dynamic Random Access Memory (DRAM)). In the conventional computer system, the graphics region allocated in the cache memory has a corresponding graphics region present in the main memory (e.g. because that is how conventional cache systems are arranged). The BIOS will hand over details of the graphics region to the OS, and the OS will be able to allocate parts of this graphics region to the graphics driver that, for example, will use it for memory to be accessed by a display controller. Locking the graphics region in the cache memory is preferable to the OS allocating other system memory present to the graphics driver, as other memories may not provide sufficient bandwidth for the graphics tasks being undertaken. The graphics region, by virtue of having been locked into cache memory, will exhibit high performance. Except where handed over from the OS to the graphics driver, the graphics region must operate as a persistent memory structure, so as not to break computer operating conventions that would render it unusable for any other task the OS sees fit to use it for.

In the conventional computer system, if the graphics driver does not need all the memory of the graphics region (maybe because only a single medium-resolution display has been connected in a system where the graphics region was sized to accommodate three high-resolution displays without requiring reconfiguration, or maybe because the display content is only using a single display overlay), the graphics driver may instruct (details not shown) the cache controller to release the lock (or unpin) sections of the graphics region from the cached memory. The space released in the fast DRAM may now be used by the cache controller for caching additional other regions from main memory. Unfortunately, however, on releasing sections of the graphics region from being locked into the cache, the cache controller is still duty-bound to write-back the dirty cache data from fast DRAM to the large main memory. The write-back operation takes up time and bandwidth. In the conventional computer system, should the graphics driver subsequently decide that it requires a larger part of the graphics region to be held in fast DRAM, it may request to re-lock (or re-pin) the additional parts, and this will result in the cache controller (immediately or delayed, depending on implementation) having to copy the data for these additional parts of the graphics region from the large main memory to the fast DRAM, imposing power penalties and creating a delay for graphics driver and other users of the memory.

Advantageously, an electronic processing system in accordance with some embodiments can arrange that the graphics driver will only release from being pinned in cache those parts of the graphics region that it has no intention of using at all (not even just to maintain the data that is already stored there), and that it will not use these parts again without re-pinning them. With this advantageous arrangement, the graphics driver may never need to access the large main memory for any graphics region, nor is the main memory expected to maintain any contents of the graphics region, nor is the cache tied up with maintaining parts of the graphics region that are not in use. According to some embodiments, the graphics region is effectively removed from and independent of the main memory.

An example of an embodiment of a computer system may include one or more of the following features and advantages. From system boot time until ownership of the graphics region has been transferred to the graphics driver, the graphics region is mapped into the fast DRAM due to it being pinned there. The graphics region may be chosen to be a place in the system memory map that is outside the capacity limits of the large main memory, freeing up that part of main memory for other uses. The cache controller does not bother writing-back parts of the graphics region as a result of their being unpinned, but simply destroys them. On receiving a request to re-pin part of the graphics region, the cache controller does not attempt to fetch the relevant contents from main memory, but instead simply creates the parts in cache using new data such as all-zeros. With no actual main memory allocated for the graphics region, no data from the graphics region is preserved in the main memory. The pinning and unpinning of parts of the graphics region may be performed by the cache controller in response to requests to do so by the graphics driver. No OS involvement is required in this process. Rather, it may be a direct communication between the graphics driver (or graphics hardware) and the cache controller.

Figure 7A:
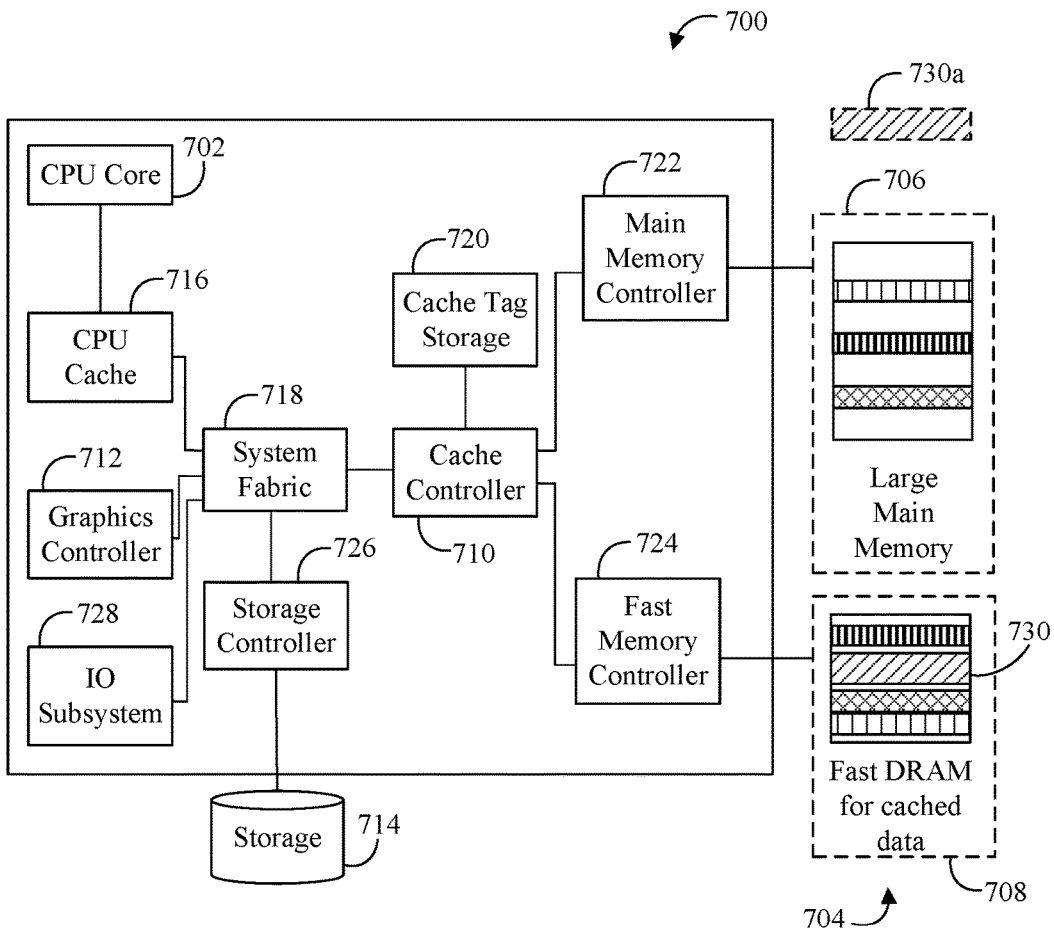
FIGS. 7A and 7B are block diagrams of an example of another electronic processing system according to an embodiment.
Figure 7B:
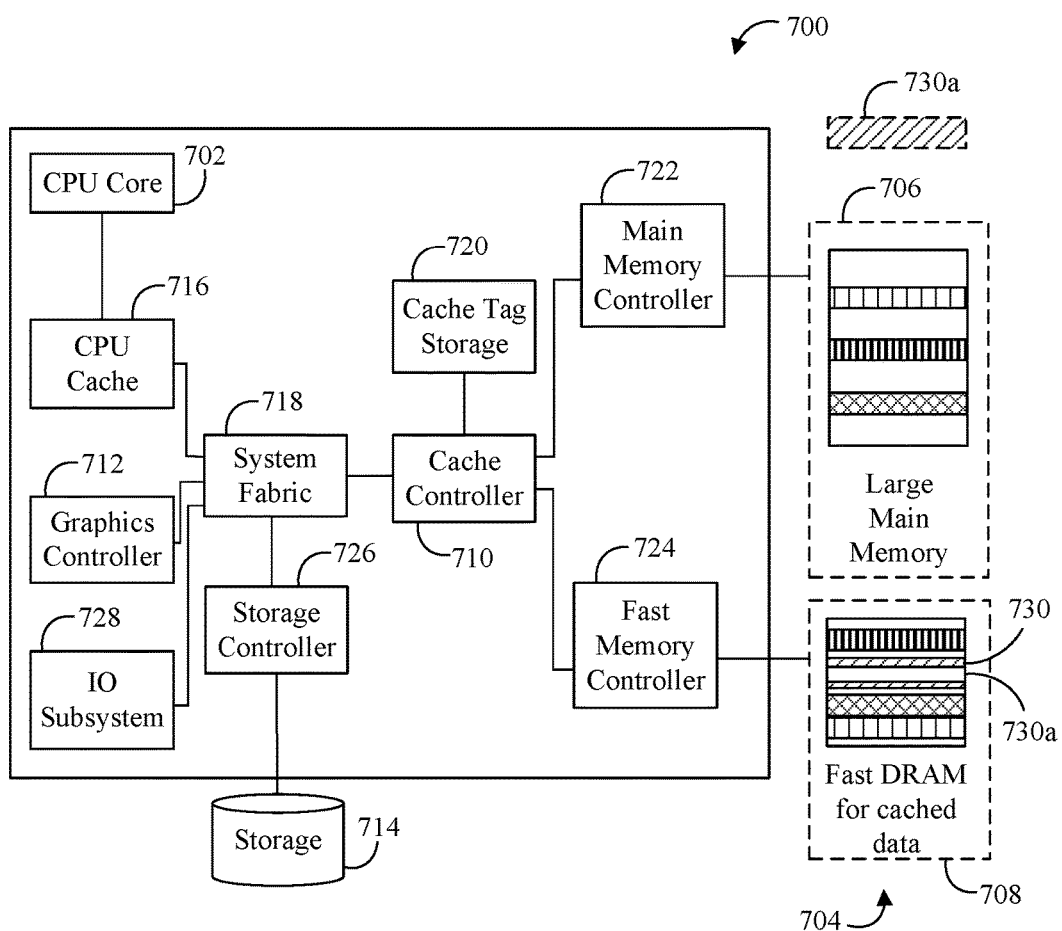

Turning now to FIGS. 7A and 7B, an electronic processing system 700 may include a CPU core 702, a multi-level memory 704 coupled to the CPU core 702 (the multi-level memory including at least a main memory (or far memory) 706 and a cache memory (or near memory) 708), a cache controller 710 coupled to the cache memory 708, a graphics controller 712 coupled to the cache controller 710, and a storage system 714 coupled to the CPU core 702 and the multi-level memory 704.

For example, both the main memory 706 and the cache memory 708 may generally be volatile memory. In some embodiments, however, one or both of the main memory 706 and the cache memory 708 may be non-volatile memory. Non-volatile memory may be a storage medium that does not require power to maintain the state of data stored by the medium. Non-limiting examples of nonvolatile memory may include any or a combination of: solid state memory (such as planar or 3D NAND flash memory or NOR flash memory), 3D crosspoint memory, storage devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMs), and magnetic storage memory. In some embodiments, 3D crosspoint memory may comprise a transistor-less stackable cross point architecture in which memory cells sit at the intersection of words lines and bit lines and are individually addressable and in which bit storage is based on a change in bulk resistance. In particular embodiments, a main memory 706 with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at www.jedec.org).

Volatile memory may be a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of the main memory 706 or cache memory 708 may comply with a standard promulgated by JEDEC, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org). Such standards (and similar standards) may be referred to as DDR-based standards and communication interfaces of the storage devices that implement such standards may be referred to as DDR-based interfaces.

The system 700 may further include various other components coupled in between the CPU core 702, the memory 704, the cache controller 710, the graphics controller 712, and the storage system 714. For example, as illustrated, the system 700 may include a CPU cache 716 and a system fabric 718 coupled between the CPU core 702 and the cache controller 710. The system 700 may include a cache tag storage 720 coupled to the cache controller 710. The system 700 may include main (or far) memory controller 722 coupled between the cache controller 710 and the main memory 706 and a fast (or near) memory controller 724 coupled between the cache controller 710 and the cache memory 708. The system 700 may further include a storage controller 726 coupled between the storage system 714 and the system fabric 718 and an input/output (I/O) subsystem 728 coupled to the system fabric 718. Those skilled in the art will appreciate that there are numerous alternatives as to how to arrange an electronic processing system and that the various blocks are optional depending on the system set up and requirements. Numerous other arrangements will occur to those skilled in the art.

Advantageously, in some embodiments of the electronic processing system 700 the storage system 714 may store code which when executed by the CPU core 702 is to receive a request at the cache controller 710 to pin a graphics region 730 in the cache memory 708, pin the graphics region 730 in the cache memory 708 at the cache controller 710 in response to the request, determine at the graphics controller 712 if a part of the graphics region 730 is not needed, and communicate from the graphics controller 712 to the cache controller 710 to request to destroy an unneeded part of the graphics region 730, and unpin the unneeded part of the graphics region 730 at the cache controller 710 in response to the communication from the graphics controller 712 without writing back any contents of the unneeded part of the graphics region 730 to the main memory 706.

Memory block 730a is illustrated in dashed lines to represent how nominally, for example, the graphics region 730 may be part of the system address map, but it is not actually stored in any memory device outside the cache memory 708. In some embodiments of the system 700, unpinning any part of the graphics region 730 may have the effect of destroying the data in that part (e.g., irrespective of whether the data is written-back or not towards main memory, the data will not be maintained, as there is no main memory 706 allocated to hold it). Referring to FIG. 7B, for example, the graphics region 730 includes a blank portion 730a in the middle of the graphics region 730 to represent an unpinned part of the graphics region 730.

In some embodiments of the electronic processing system 700, the code may be further to determine at the graphics controller 712 if a part of the graphics region 730 not currently pinned in the cache memory 708 is needed, to communicate from the graphics controller 712 to the cache controller 710 the cache controller 710 to request to create the needed part of the graphics region 730, and to pin the needed part of the graphics region 730 at the cache controller 710 in response to the communication from the graphics controller 712. For example, the code may be further to fill the needed part of the graphics region 730 pinned in the cache memory 708 with a pre-determined value at the cache controller 710 without reading any contents of the main memory 706. For example, in some embodiments of the system 700, pinning any part of the graphics region 730 into cache memory 708 may have the effect of creating new data for that part, as there is no main memory from which to bring the data to be cached, and therefore new data may be placed in the cache memory 708, by the cache controller 710 as a starting point.

By way of explanation and not limitation, a further understanding of some embodiments of the system 700 may be aided by looking at the system 700 from the point-of-view of an operating system (OS). As far as the OS knows, the graphics region 730 is just a region of system memory that happens to always have good performance due to being cached. From the OS perspective, those parts of the graphics region 730 subsequently unpinned by the graphics driver may behave as if the graphics driver (or other graphics hardware) were constantly writing zeros to it, this being consistent with acceptable behavior within a memory region allocated by the OS to software, especially where the software is a driver operating a hardware unit capable of writing to memory. However, when considering matters from an example hardware perspective (e.g., as shown in FIG. 7B), it is clear that the only memory actually taken by the graphics driver is the memory that it needs (specifically those parts of the graphics region that it has determined not to unpin from the cache). For further clarification, it should be clear that 'destroying' the data may be considered analogous (from the system's perspective) to the graphic driver permitting a hardware element (in this case, the cache controller nominally under control of the graphics driver) to be constantly direct memory addressing (DMA'ing) zeros to the region holding the destroyed data. The process of 'creating' the data may be considered be analogous to the hardware element no longer constantly DMA'ing zeros to that region.

Given that the unpinned parts of the graphics region 730 has been allocated from the OS to the graphics driver, and given that the graphics driver has decided that it is not using those parts of the graphics region 730, it will be clear that there is generally no reason for the CPU or any other part of the system to attempt to access these unpinned parts of the graphics region 730. Nevertheless, to ensure consistent system operation, a mechanism may be implemented whereby cache controller 710, main memory controller 722, system fabric 718, or some other part of system 700 will handle such accesses, for example, by returning zeros values in response to any reads and acknowledging any writes.

Figures 8A, 8B:
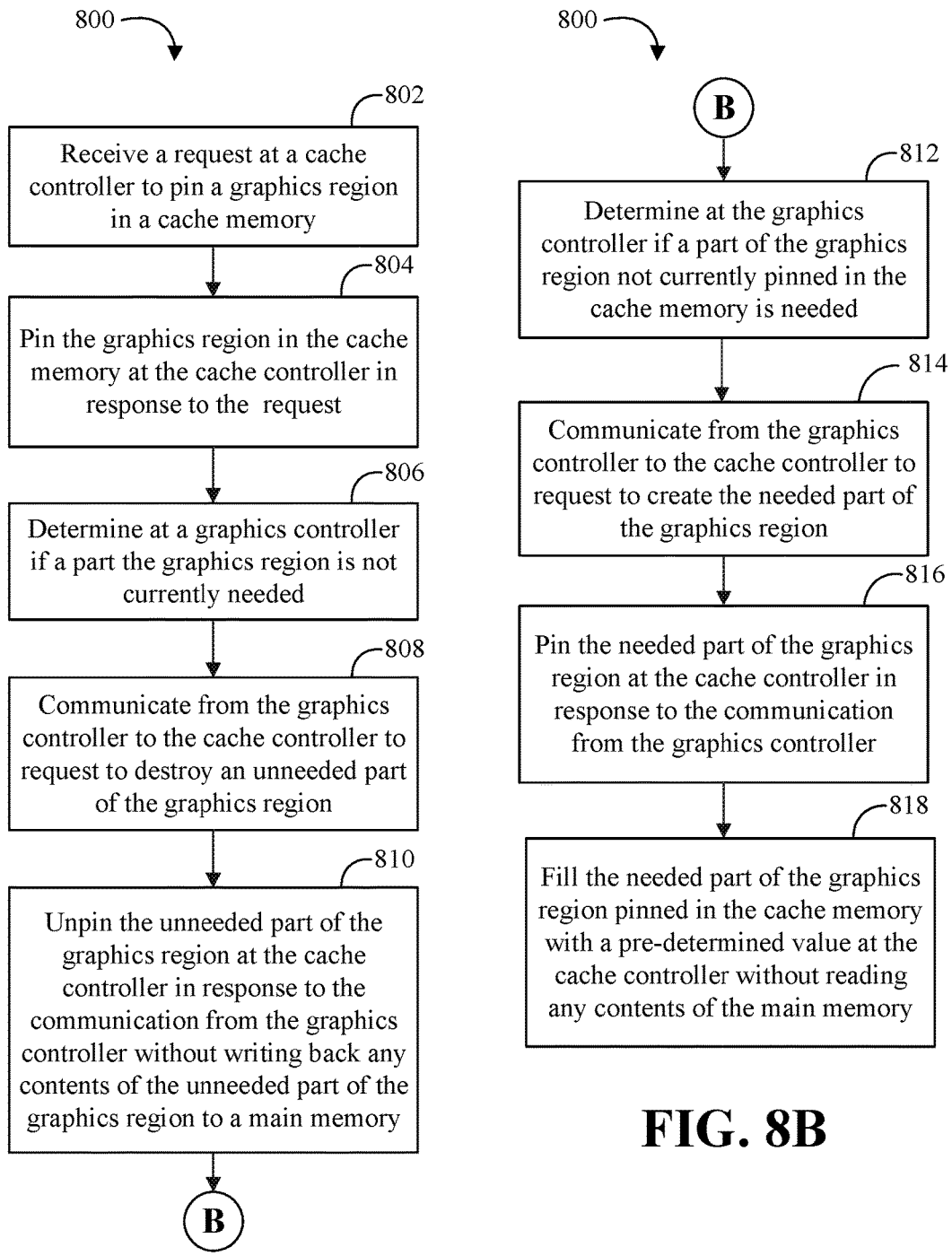
FIGS. 8A and 8B are flowcharts of an example of another method of operating an electronic processing system according to an embodiment.

FIGS. 8A to 8B show an embodiment of a method 800 of operating an electronic processing system. The method 800 may generally be implemented in an electronic processing system such as, for example, the electronic processing system 700 (FIGS. 7A and 7B), already discussed. More particularly, the method 800 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The method 800 of operating an electronic processing system may include receiving a request at a cache controller to pin a graphics region in a cache memory at block 802, pinning the graphics region in the cache memory at the cache controller in response to the request at block 804, determining at a graphics controller if a part the graphics region is not currently needed at block 806, communicating from the graphics controller to the cache controller to request to destroy an unneeded part of the graphics region at block 808, and unpinning the unneeded part of the graphics region at the cache controller in response to the communication from the graphics controller without writing back any contents of the unneeded part of the graphics region to a main memory at block 810.

Some embodiments of the method 800 may further include determining at the graphics controller if a part of the graphics region not currently pinned in the cache memory is needed at block 812, communicating from the graphics controller to the cache controller to request to create the needed part of the graphics region at block 814, and pinning the needed part of the graphics region at the cache controller in response to the communication from the graphics controller at block 816. For example, the method 800 may further include filling the needed part of the graphics region pinned in the cache memory with a pre-determined value at the cache controller without reading any contents of the main memory at block 818.

Turning back to FIGS. 7A and 7B, some embodiments of the electronic processing system 700 may involve a boot process or initialization process. For example, the storage system 714 may store code which when executed by the CPU core 702 is to provide a basic input output system (BIOS), provide an operating system (OS), and define at the BIOS a block of addresses within a physical memory map for the graphics region 730 that is outside a physical limit of the available main memory 706. The code may be further to request from the BIOS to the cache controller 710 to pin all of the graphics region 730 in the cache memory 708, pin the graphics region 730 in the cache memory 708 at the cache controller 710 in response to the BIOS request, and notify from the BIOS to the OS of the block of addresses assigned to the graphics region 730. The code may be further to allocate the graphics region 730 to the graphics controller 712 at the OS, and notify from the OS to the graphics controller 712 of the allocated graphics region 730.

In this example, the system 700 may support a memory abandonment process between the graphics controller 712 and the cache controller 710 that is transparent to the OS. For example, the code may be further to determine at the graphics controller 712 if a part of the allocated parts of the graphics region 730 is not currently needed, bypass the OS to communicate from the graphics controller 712 to the cache controller 710 to request to destroy an unneeded part of the graphics region 730, and unpin the unneeded part of the graphics region 730 at the cache controller 710 in response to the communication from the graphics controller 712 without writing back any contents of the unneeded part of the graphics region 730 to the main memory 706. The system 700 may further support a system memory reclamation process between the graphics controller 712 and the cache controller 710 that is transparent to the OS. For example, the code may be further to determine at the graphics controller 712 if a part of the allocated parts of the graphics region 730 not currently pinned in the cache memory 708 is newly needed, bypass the OS to communicate from the graphics controller 712 to the cache controller 710 to create the newly needed part of the graphics region 730, and pin the newly needed part of the graphics region 730 at the cache controller 710 in response to the communication from the graphics controller 712. The code may be further to fill the newly pinned portion of the cache memory 708 with a pre-determined value at the cache controller 710 without reading any contents of the main memory 706.

Figure 9A:
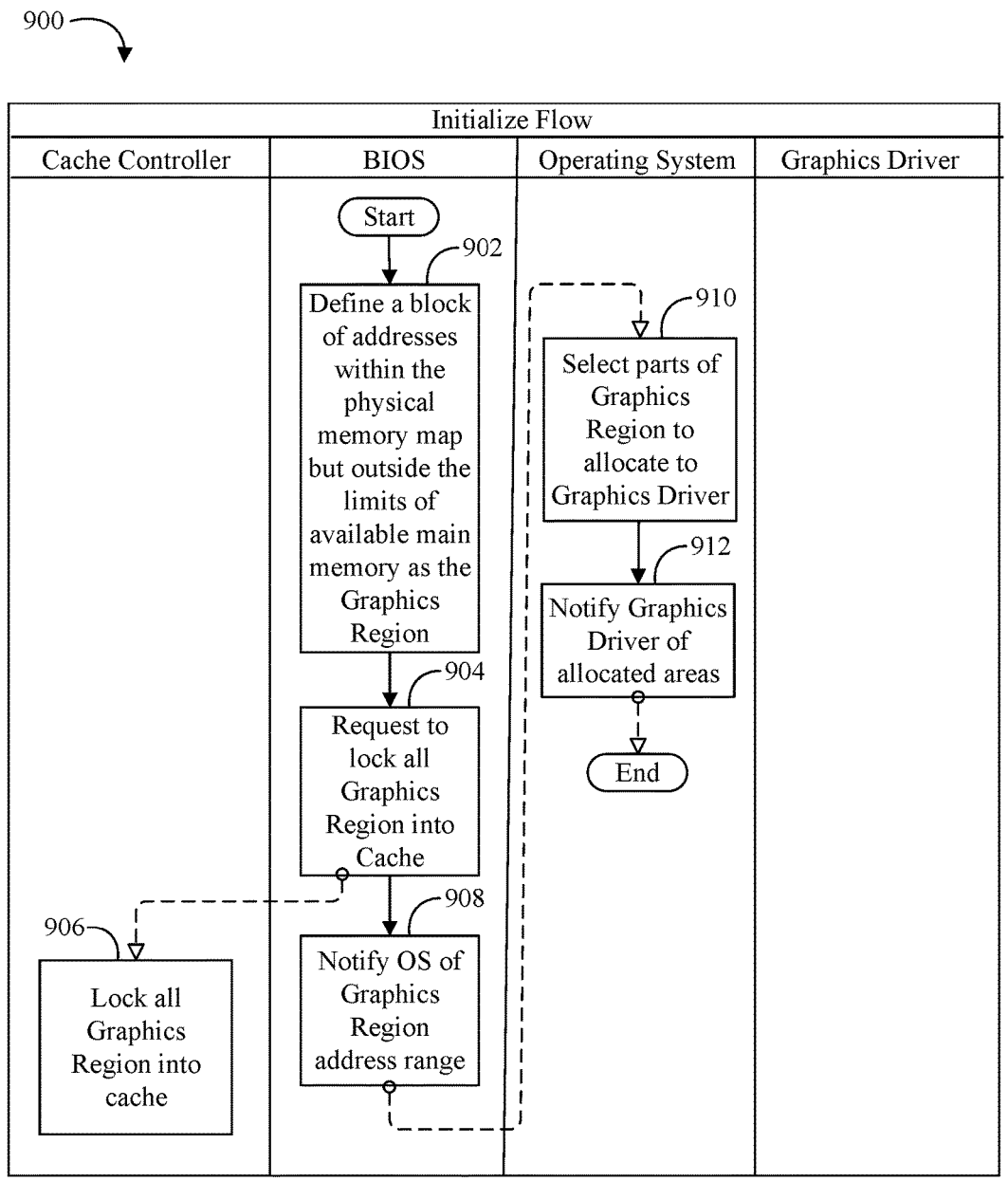
FIGS. 9A to 9C are flowcharts of an example of another method of operating an electronic processing system according to an embodiment.
Figure 9B:
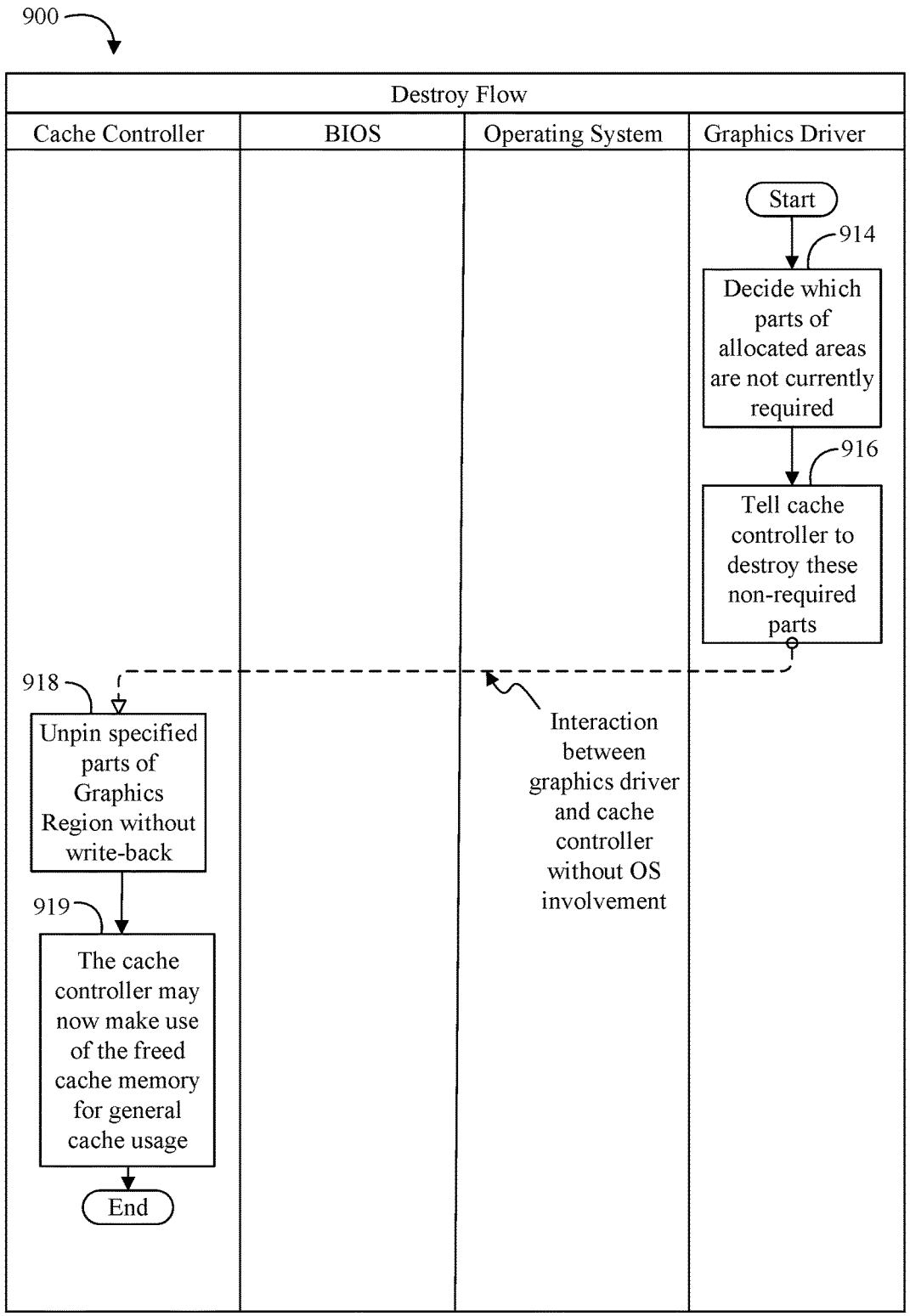
Figure 9C:
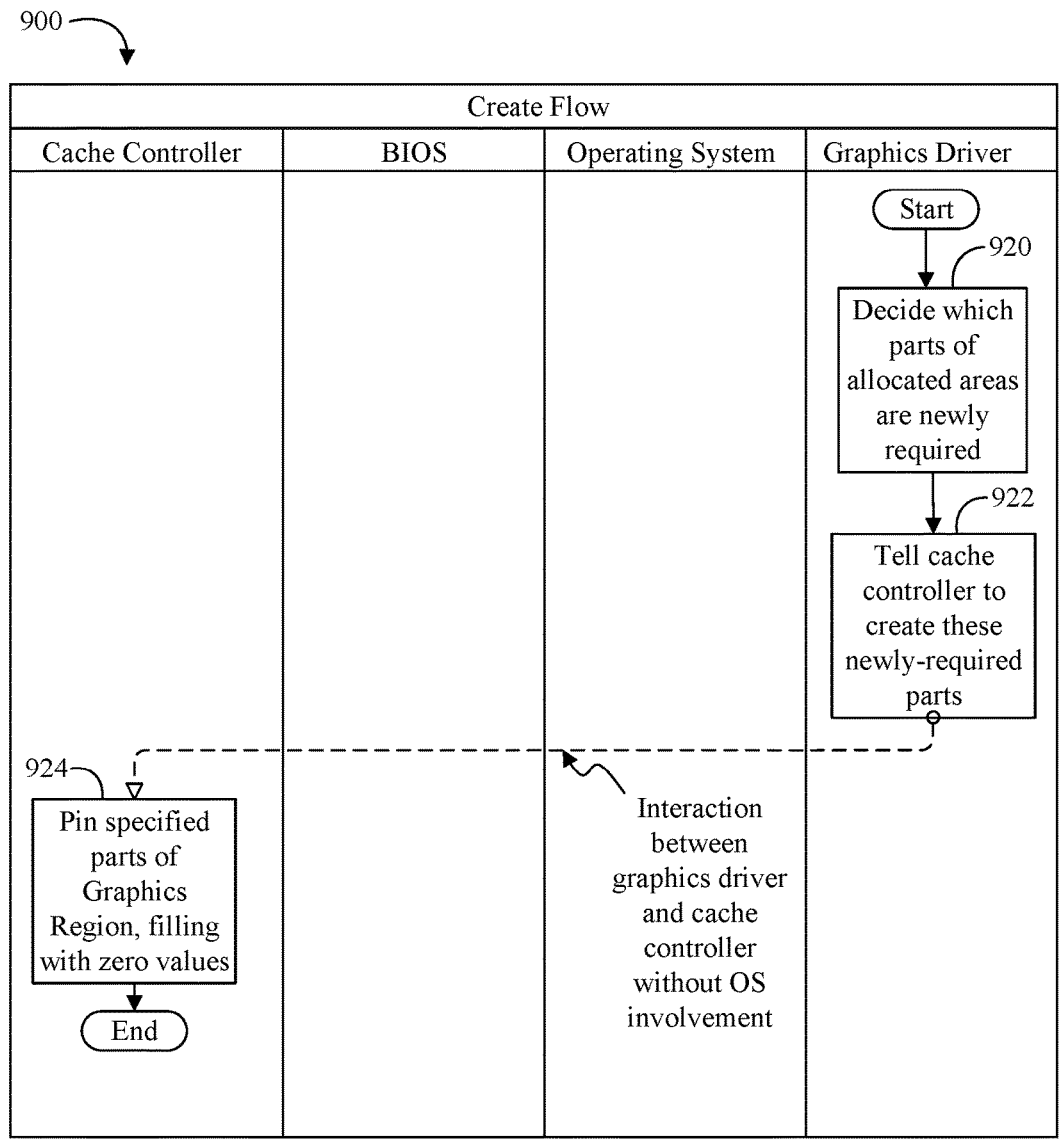

FIGS. 9A to 9C show an embodiment of a method 900 of operating an electronic processing system. The method 900 may generally be implemented in an electronic processing system such as, for example, the electronic processing system 700 (FIGS. 7A and 7B), already discussed. More particularly, the method 900 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

For example, an embodiment of an initialization flow (FIG. 9A) for the method 900 of operating an electronic processing system may include defining at a basic input output system (BIOS) a block of addresses within a physical memory map for a graphics region that is outside a physical limit of an available main memory at block 902, requesting from the BIOS to a cache controller to pin all of the graphics region in a cache memory at block 904, pinning the graphics region in the cache memory at the cache controller in response to the BIOS request at block 906, notifying from the BIOS to an operating system (OS) of the block of addresses assigned to the graphics region at block 908, allocating parts of the graphics region to a graphics controller at the OS in response to the notification from the BIOS at block 910, and notifying from the OS to the graphics controller of the allocated parts of the graphics region at block 912.

For example, an embodiment of a destroy flow (FIG. 9B) for the method 900 may further include determining at the graphics controller if a part of the allocated parts of the graphics region is not currently needed at block 914, bypassing the OS to communicate from the graphics controller to the cache controller to request to destroy an unneeded part of the graphics region at block 916, and unpinning the unneeded part of the graphics region at the cache controller in response to the communication from the graphics controller without writing back any contents of the unneeded part of the graphics region to the main memory at block 918. The cache controller may now make use of the freed cache memory for general cache usage at block 919.

For example, an embodiment of a create flow (FIG. 9C) for the method 900 may further include determining at the graphics controller if a part of the allocated parts of the graphics region not currently pinned in the cache memory is newly needed at block 920, bypassing the OS to communicate from the graphics controller to the cache controller to create the newly needed part of the graphics region at block 922, and pinning the newly needed part of the graphics region at the cache controller in response to the communication from the graphics controller at block 924. The cache controller may evict cache entries from the cache portion of the cache memory as needed to pin the newly needed parts of the graphics region. For example, the method 900 may further include filling the newly pinned portion of the cache memory with a pre-determined value at the cache controller without reading any contents of the main memory at block 924.

Advantageously, some embodiments of the create and destroy flows may allow for parts of the graphics region to be destroyed and created within the cache without OS involvement and without the power, bandwidth, and delays of syncing between fast DRAM cache and main memory. For example, some embodiments of an interaction may be directly between the graphics driver and the cache controller, or through an intermediary, such as the display controller or other SoC sub-system.

Additional Notes and Examples

Example 1 may include a method of operating an electronic processing system, including defining at a basic input output system (BIOS) a block of addresses within a physical memory map for a graphics region that is outside a physical limit of an available main memory, requesting from the BIOS to a cache controller to pin all of the graphics region in a cache memory, pinning the graphics region in the cache memory at the cache controller in response to the BIOS request, notifying from the BIOS to an operating system (OS) of the block of addresses assigned to the graphics region, allocating parts of the graphics region to a graphics controller at the OS in response to the notification from the BIOS, notifying from the OS to the graphics controller of the allocated parts of the graphics region, determining at the graphics controller if a part of the allocated parts of the graphics region is not currently needed, bypassing the OS to communicate from the graphics controller to the cache controller to request to destroy an unneeded part of the graphics region, and unpinning the unneeded part of the graphics region at the cache controller in response to the communication from the graphics controller without writing back any contents of the unneeded part of the graphics region to the main memory.

Example 2 may include the method of Example 1, further comprising determining at the graphics controller if a part of the allocated parts of the graphics region not currently pinned in the cache memory is newly needed, bypassing the OS to communicate from the graphics controller to the cache controller to create the newly needed part of the graphics region, and pinning the newly needed part of the graphics region at the cache controller in response to the communication from the graphics controller.

Example 3 may include the method of Example 2, further comprising filling the newly pinned portion of the cache memory with a pre-determined value at the cache controller without reading any contents of the main memory.

Example 4 may include an electronic processing system, including a processor, a multi-level memory coupled to the processor, the multi-level memory including at least a main memory and a cache memory, a cache controller coupled to the cache memory, a graphics controller coupled to the cache controller, and a storage system coupled to the processor and the multi-level memory, the storage system storing code which when executed by the processor is to provide a basic input output system (BIOS), provide an operating system (OS), define at the BIOS a block of addresses within a physical memory map for a graphics region that is outside a physical limit of the main memory, request from the BIOS to the cache controller to pin all of the graphics region in the cache memory, pin the graphics region in the cache memory at the cache controller in response to the BIOS request, notify from the BIOS to the OS of the block of addresses assigned to the graphics region, allocate parts of the graphics region to the graphics controller at the OS in response to the notification from the BIOS, notify from the OS to the graphics controller of the allocated parts of the graphics region, determine at the graphics controller if a part of the allocated parts of the graphics region is not currently needed, bypass the OS to communicate from the graphics controller to the cache controller to request to destroy an unneeded part of the graphics region, and unpin the unneeded part of the graphics region at the cache controller in response to the communication from the graphics controller without writing back any contents of the unneeded part of the graphics region to the main memory.

Example 5 may include the electronic processing system of Example 4, wherein the code is further to determine at the graphics controller if a part of the allocated parts of the graphics region not currently pinned in the cache memory is newly needed, bypass the OS to communicate from the graphics controller to the cache controller to create the newly needed part of the graphics region, and pin the newly needed part of the graphics region at the cache controller in response to the communication from the graphics controller.

Example 6 may include the electronic processing system of Example 5, wherein the code is further to fill the newly pinned portion of the cache memory with a pre-determined value at the cache controller without reading any contents of the main memory.

Example 7 may include a method of operating an electronic processing system, including receiving a request at a cache controller to pin a graphics region in a cache memory, pinning the graphics region in the cache memory at the cache controller in response to the request, determining at a graphics controller if a part the graphics region is not needed, communicating from the graphics controller to the cache controller to request to destroy an unneeded part of the graphics region, and unpinning the unneeded part of the graphics region at the cache controller in response to the communication from the graphics controller without writing back any contents of the unneeded part of the graphics region to a main memory.

Example 8 may include the method of Example 7, further comprising determining at the graphics controller if a part of the graphics region not currently pinned in the cache memory is needed, communicating from the graphics controller to the cache controller to request to create the needed part of the graphics region, and pinning the needed part of the graphics region at the cache controller in response to the communication from the graphics controller.

Example 9 may include the method of Example 8, further comprising filling the needed part of the graphics region pinned in the cache memory with a pre-determined value at the cache controller without reading any contents of the main memory.

Example 10 may include an electronic processing system, including a processor, a multi-level memory coupled to the processor, the multi-level memory including at least a main memory and a cache memory, a cache controller coupled to the cache memory, a graphics controller coupled to the cache controller, and a storage system coupled to the processor and the multi-level memory, the storage system storing code which when executed by the processor is to: receive a request at the cache controller to pin a graphics region in the cache memory, pin the graphics region in the cache memory at the cache controller in response to the request, determine at the graphics controller if a part of the graphics region is not needed, communicate from the graphics controller to the cache controller to request to destroy an unneeded part of the graphics region, and unpin the unneeded part of the graphics region at the cache controller in response to the communication from the graphics controller without writing back any contents of the unneeded part of the graphics region to the main memory.

Example 11 may include the electronic processing system of Example 10, wherein the code is further to determine at the graphics controller if a part of the graphics region not currently pinned in the cache memory is needed, communicate from the graphics controller to the cache controller to request to create the needed part of the graphics region, and pin the needed part of the graphics region at the cache controller in response to the communication from the graphics controller.

Example 12 may include the electronic processing system of Example 11, wherein the code is further to fill the needed part of the graphics region pinned in the cache memory with a pre-determined value at the cache controller without reading any contents of the main memory.

Example 13 may include a method of controlling a multi-level memory system, including providing a main memory of the multi-level memory system, providing a fast memory of the multi-level memory system with relatively faster performance as compared to the main memory, allocating a cache portion of the fast memory to a cache region to allow a corresponding mapping of elements of the main memory to the cache region, and allocating a graphics portion of the fast memory to a graphics region with no corresponding mapping of the graphics region with the main memory.

Example 14 may include the method of Example 13, further comprising maintaining memory coherency between only the main memory and the cache portion of the fast memory.

Example 15 may include the method of Example 14, further comprising dynamically allocating an amount of memory for each of the cache and graphics portions of the fast memory.

Example 16 may include the method of Example 15, further comprising receiving a request to allocate an additional portion of the fast memory to the graphics portion of the fast memory, allocating the requested additional portion to the graphics portion of the fast memory in response to the request, and initializing the newly allocated portion of the fast memory to a pre-determined state without reference to any contents of the main memory.

Example 17 may include the method of Example 16, further comprising evicting cache entries from the cache portion of the fast memory as needed to allocate the requested additional portion to the graphics portion.

Example 18 may include the method of Example 15, further comprising receiving a request to abandon a sub-portion of the graphics portion of the fast memory, de-allocating the abandoned sub-portion of the fast memory responsive to the request without causing the contents of the abandoned sub-portion to be written back to the main memory, and allocating the abandoned sub-portion of the fast memory to the cache portion of the fast memory.

Example 19 may include an electronic processing system, including a processor, a multi-level memory coupled to the processor, the multi-level memory including at least a main memory and a fast memory, the fast memory having relatively faster performance as compared to the main memory, a fast memory controller coupled to the fast memory, and a graphics controller coupled to the fast memory controller, wherein the fast memory includes: a cache portion allocated to a cache region to allow a corresponding mapping of elements of the main memory in the cache region, and a graphics portion allocated to a graphics region for the graphics controller with no corresponding mapping of the graphics region with the main memory.

Example 20 may include the electronic processing system of Example 19, wherein the fast memory controller is to maintain memory coherency between only the main memory and the cache portion of the fast memory.

Example 21 may include the electronic processing system of Example 20, wherein the fast memory controller is to dynamically allocate an amount of memory for each of the cache and graphics portions of the fast memory.

Example 22 may include the electronic processing system of Example 21, wherein the fast memory controller is further to receive a request from the graphics controller to allocate an additional portion of the fast memory to the graphics portion of the fast memory, allocate the requested additional portion to the graphics portion of the fast memory in response to the request, and initialize the newly allocated portion of the fast memory to a pre-determined state without reference to any contents of the main memory.

Example 23 may include the electronic processing system of Example 22, wherein the fast memory controller is further to evict cache entries from the cache portion of the fast memory as needed to allocate the requested additional portion to the graphics portion.

Example 24 may include the electronic processing system of Example 21, wherein the fast memory controller is further to receive a request from the graphics controller to abandon a sub-portion of the graphics portion of the fast memory, de-allocate the abandoned sub-portion of the fast memory responsive to the request without causing the contents of the abandoned sub-portion to be written back to main memory, and allocate the abandoned sub-portion of the fast memory to the cache portion of the fast memory.

Example 25 may include a method of operating an electronic processing system, including requesting from a graphics controller to a cache controller to allocate a portion of a cache memory to a graphics region with no corresponding mapping of the graphics region with a main memory, allocating the graphics region in the cache memory at the cache controller in response to the request from the graphics controller transparent to an operating system, selectively requesting from the graphics controller to the cache controller to abandon portions of the graphics region in accordance with a graphics operation mode transparent to the operating system, and de-allocating the abandoned portion of the graphics region at the cache controller in response to the request from the graphics controller transparent to the operating system.

Example 26 may include the method of Example 25, further comprising requesting from the graphics controller to the cache controller to reclaim a portion of the cache memory as part of the graphics region of the cache memory transparent to the operating system, and allocating an additional portion of the cache memory to the graphics region at the cache controller in response to the request from the graphics controller.

Example 27 may include the method of Example 26, further comprising initializing the reclaimed additional portion of the cache memory to a pre-determined state at the cache controller without any reference to any contents of the main memory.

Example 28 may include an electronic processing system, including a processor, a persistent storage media coupled to the processor, the persistent storage media storing code which when executed by the processor is to provide an operating system for the electronic processing system, a multi-level memory system coupled to the processor, the multi-level memory system including at least a cache memory and a main memory, a cache controller coupled to the cache memory, and a graphics controller coupled to the cache controller, the graphics controller to request the cache controller to allocate a portion of the cache memory to a graphics region with no corresponding mapping of the graphics region with the main memory, and selectively request the cache controller to abandon a sub-portion of the graphics region in accordance with a graphics operation mode transparent to the operating system, and wherein the cache controller is to: allocate the graphics region in the cache memory in response to the request from the graphics controller transparent to the operating system, and de-allocate the abandoned sub-portion of the graphics region in response to the request from the graphics controller transparent to the operating system.

Example 29 may include the electronic processing system of Example 28, wherein the graphics controller is further to request the cache controller to reclaim a portion of the cache memory as part of the graphics region of the cache memory transparent to the operating system, and wherein the cache controller is further to allocate an additional portion of the cache memory to the graphics region in response to the request from the graphics controller.

Example 30 may include the processing system of Example 29, wherein the cache controller is further to initialize the reclaimed additional portion of the cache memory to a pre-determined state without any reference to any contents of the main memory.

Example 31 may include a method of controlling a cache, including receiving a request to allocate a portion of a cache memory to a graphics region, allocating the requested portion of the cache memory to the graphics region, and initializing the portion of cache memory allocated to the graphics region to a pre-determined state without reference to a main memory.

Example 32 may include the method of Example 31, further comprising receiving a request to abandon a sub-portion of the portion of cache memory allocated to the graphics region, and de-allocating the abandoned sub-portion of the graphics region without causing the abandoned sub-portion to be written back to the main memory.

Example 33 may include a cache controller, including a computing device, and at least one non-transitory computer readable storage medium comprising a set of instructions, which when executed by the computing device, cause the computing device to: receive a request to allocate a portion of a cache memory to a graphics region, allocate the requested portion of the cache memory to the graphics region, and initialize the portion of cache memory allocated to the graphics region to a pre-determined state without reference to a main memory.

Example 34 may include the cache controller of Example 33, wherein the set of instructions includes further instructions, which when executed by the computing device, cause the computing device to receive a request to abandon a sub-portion of the portion of cache memory allocated to the graphics region, and de-allocate the abandoned sub-portion of the graphics region without causing the abandoned sub-portion to be written back to the main memory.

Example 35 may include a graphics controller, including a computing device, and at least one non-transitory computer readable storage medium comprising a set of instructions, which when executed by the computing device, cause the computing device to: request a portion of a cache memory to be allocated to a graphics region transparent to an operating system, and selectively request to abandon a sub-portion of the graphics region in accordance with a graphics operation mode transparent to the operating system.

Example 36 may include the graphics controller of Example 35, wherein the set of instructions includes further instructions, which when executed by the computing device, cause the computing device to request to reclaim a previously abandoned portion of the graphics region of the cache memory transparent to the operating system.

Example 37 may include the graphics controller of Example 36, wherein the set of instructions includes further instructions, which when executed by the computing device, cause the computing device to request to initialize the reclaimed portion of the graphics region to a pre-determined state without any reference to any contents of a main memory.

Example 38 may include an electronic processing system, including a processor, a main memory, a cache memory having relatively faster performance as compared to the main memory, and a cache controller, the cache controller to: receive a request to allocate a portion of the cache memory to a device region of the cache memory, allocate the portion of cache memory to the device region in response to the request with no corresponding mapping of the device region with a main memory, and initialize the portion of the cache memory allocated to the device region to a pre-determined state with no reference to any contents of the main memory.

Example 39 may include the electronic processing system of Example 38, wherein the cache controller is further to receive a request to abandon a sub-portion of the device region of the cache memory, and de-allocate the abandoned sub-portion from the device region of the cache memory responsive to the request transparent to an operating system.

Example 40 may include a method of controlling a multi-level memory, including allocating a portion of a cache memory for a device region with no corresponding mapping of the device region with a main memory, and disabling memory coherency operations between the main memory and the cache memory for the portion of the cache memory allocated to the device region.

Example 41 may include the method of Example 40, wherein disabling memory coherency operations for the portion of the cache memory allocated to the device region comprises disabling fetch operations from the main memory to the cache memory for the portion of the cache memory allocated to the device region.

Example 42 may include the method of Example 41, wherein disabling memory coherency operations for the portion of the cache memory allocated to the device region comprises disabling write back operations from the cache memory to the main memory for the portion of the cache memory allocated to the device region.

Example 43 may include the method of Example 41, wherein disabling memory coherency operations for the portion of the cache memory allocated to the device region comprises disabling write through operations from the cache memory to the main memory for the portion of the cache memory allocated to the device region.

Example 44 may include the method of Example 43, further comprising selectively abandoning a sub-portion of the portion of the cache memory allocated to the device region.

Example 45 may include the method of Example 44, further comprising selectively reclaiming to the device region a previously abandoned sub-portion of the portion of the cache memory allocated to the device region.

Example 46 may include the method of Example 45, further comprising initializing the reclaimed sub-portion of the device region with a pre-determined value not related to any contents of the main memory.

Example 47 may include the method of any of Examples 40 to 46, wherein the device region corresponds to a device comprising one of a graphics device, a high speed disk device, an algorithmic processing device, a cryptographic processing device, and a high speed input output device.

Example 48 may include an electronic processing system, including a processor, a multi-level memory coupled to the processor, the multi-level memory including at least a main memory and a cache memory, a cache controller coupled to the cache memory, a device controller coupled to the cache controller, and a storage system coupled to the processor, the storage system storing code which when executed by the processor is to: allocate a portion of a cache memory to a device region for the device controller with no corresponding mapping of the device region with the main memory, and disable memory coherency operations between the main memory and the cache memory for the portion of the cache memory allocated to the device region.

Example 49 may include the electronic processing system of Example 48, wherein the code is further to disable fetch operations from the main memory to the cache memory for the portion of the cache memory allocated to the device region.

Example 50 may include the electronic processing system of Example 49, wherein the code is further to disable write back operations from the cache memory to the main memory for the portion of the cache memory allocated to the device region.

Example 51 may include the electronic processing system of Example 49, wherein the code is further to disable write through operations from the cache memory to the main memory for the portion of the cache memory allocated to the device region.

Example 52 may include the electronic processing system of Example 51, wherein the code is further to selectively abandon a sub-portion of the portion of the cache memory allocated to the device region.

Example 53 may include the electronic processing system of Example 52, wherein the code is further to selectively reclaim to the device region a previously abandoned sub-portion of the portion of the cache memory allocated to the device region.

Example 54 may include the electronic processing system of Example 53, wherein the code is further to initialize the reclaimed sub-portion of the device region with a pre-determined value not related to any contents of the main memory.

Example 55 may include the electronic processing system of any of Examples 47 to 54, wherein the device region corresponds to a device comprising one of a graphics device, a high speed disk device, an algorithmic processing device, a cryptographic processing device, and a high speed input output device.

Example 56 may include a multi-level memory system controller, including a main memory of the multi-level memory system, a fast memory of the multi-level memory system with relatively faster performance as compared to the main memory, means for allocating a cache portion of the fast memory to a cache region to allow a corresponding mapping of elements of the main memory to the cache region, and means for allocating a graphics portion of the fast memory to a graphics region with no corresponding mapping of the graphics region with the main memory.

Example 57 may include the multi-level memory system controller of Example 56, further comprising means for maintaining memory coherency between only the main memory and the cache portion of the fast memory.

Example 58 may include the multi-level memory system controller of Example 57, further comprising means for dynamically allocating an amount of memory for each of the cache and graphics portions of the fast memory.

Example 59 may include the multi-level memory system controller of Example 58, further comprising means for receiving a request to allocate an additional portion of the fast memory to the graphics portion of the fast memory, means for allocating the requested additional portion to the graphics portion of the fast memory in response to the request, and means for initializing the newly allocated portion of the fast memory to a pre-determined state without reference to any contents of the main memory.

Example 60 may include the multi-level memory system controller of Example 59, further comprising means for evicting cache entries from the cache portion of the fast memory as needed to allocate the requested additional portion to the graphics portion.

Example 61 may include the multi-level memory system controller of any of Examples 58 to 60, further comprising means for receiving a request to abandon a sub-portion of the graphics portion of the fast memory, means for de-allocating the abandoned sub-portion of the fast memory responsive to the request without causing the contents of the abandoned sub-portion to be written back to the main memory, and means for allocating the abandoned sub-portion of the fast memory to the cache portion of the fast memory.

Example 62 may include at least one computer readable medium comprising a set of instructions, which when executed by a computing device, cause the computing device to allocate a portion of a cache memory to a device region for a device controller with no corresponding mapping of the device region with a main memory, and disable memory coherency operations between the main memory and the cache memory for the portion of the cache memory allocated to the device region.

Example 63 may include the at least one computer readable medium of Example 62, comprising a further set of instructions, which when executed by a computing device, cause the computing device to selectively abandon a sub-portion of the portion of the cache memory allocated to the device region.

Example 64 may include the at least one computer readable medium of Example 62, comprising a further set of instructions, which when executed by a computing device, cause the computing device to initialize the allocated portion of the device region with a pre-determined value not related to any contents of the main memory.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated. The various blocks described in connection with flow diagrams do not imply an order of operation unless explicitly stated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A method of controlling a multi-level memory system, comprising:
   providing a main memory of the multi-level memory system;
   providing a fast memory of the multi-level memory system with relatively faster performance as compared to the main memory;
   allocating a cache portion of the fast memory to a cache region to allow a corresponding mapping of elements of the main memory to the cache region;
   allocating a graphics portion of the fast memory to a graphics region with no corresponding mapping of the graphics region with the main memory;
   maintaining memory coherency between only the main memory and the cache portion of the fast memory; and
   dynamically allocating an amount of memory for each of the cache and graphics portions of the fast memory, the method further comprising:
   receiving a request to abandon a sub-portion of the graphics portion of the fast memory;
   de-allocating the abandoned sub-portion of the fast memory responsive to the request without causing the contents of the abandoned sub-portion to be written back to the main memory; and
   allocating the abandoned sub-portion of the fast memory to the cache portion of the fast memory.

2. The method of claim 1, further comprising:
   receiving a request to allocate an additional portion of the fast memory to the graphics portion of the fast memory;
   allocating the requested additional portion to the graphics portion of the fast memory in response to the request; and
   initializing the newly allocated portion of the fast memory to a pre-determined state without reference to any contents of the main memory.

3. The method of claim 2, wherein the pre-determined state comprises all zero values for the newly allocated portion of the fast memory.

4. The method of claim 2, further comprising:
   evicting cache entries from the cache portion of the fast memory as needed to allocate the requested additional portion to the graphics portion.

5. An electronic processing system, comprising:
   a processor;
   a multi-level memory coupled to the processor, the multi-level memory including at least a main memory and a fast memory, the fast memory having relatively faster performance as compared to the main memory;
   a fast memory controller coupled to the fast memory; and a graphics controller coupled to the fast memory controller,
wherein the fast memory includes:
a cache portion allocated to a cache region to allow a corresponding mapping of elements of the main memory in the cache region, and
a graphics portion allocated to a graphics region for the graphics controller with no corresponding mapping of the graphics region with the main memory,
wherein the fast memory controller is to:
maintain memory coherency between only the main memory and the cache portion of the fast memory, and
dynamically allocate an amount of memory for each of the cache and graphics portions of the fast memory, the fast memory controller further to:
receive a request from the graphics controller to abandon a sub-portion of the graphics portion of the fast memory,
de-allocate the abandoned sub-portion of the fast memory responsive to the request without causing the contents of the abandoned sub-portion to be written back to main memory, and
allocate the abandoned sub-portion of the fast memory to the cache portion of the fast memory.

6. The electronic processing system of claim 5, wherein the fast memory controller is further to:
receive a request from the graphics controller to allocate an additional portion of the fast memory to the graphics portion of the fast memory;
allocate the requested additional portion to the graphics portion of the fast memory in response to the request; and
initialize the newly allocated portion of the fast memory to a pre-determined state without reference to any contents of the main memory.

7. The electronic processing system of claim 6, wherein the pre-determined state comprises all zero values for the newly allocated portion of the fast memory.

8. The electronic processing system of claim 6, wherein the fast memory controller is further to:
evict cache entries from the cache portion of the fast memory as needed to allocate the requested additional portion to the graphics portion.

9. At least one non-transitory computer readable storage medium comprising a set of instructions, which when executed by a computing device, cause the computing device to:
provide a main memory of a multi-level memory system;
provide a fast memory of the multi-level memory system with relatively faster performance as compared to the main memory;
allocate a cache portion of the fast memory to a cache region to allow a corresponding mapping of elements of the main memory to the cache region;
allocate a graphics portion of the fast memory to a graphics region with no corresponding mapping of the graphics region with the main memory;
maintain memory coherency between only the main memory and the cache portion of the fast memory; and
dynamically allocate an amount of memory for each of the cache and graphics portions of the fast memory, the computing device further to:
receive a request to abandon a sub-portion of the graphics portion of the fast memory;
de-allocate the abandoned sub-portion of the fast memory responsive to the request without causing the contents of the abandoned sub-portion to be written back to the main memory; and
allocate the abandoned sub-portion of the fast memory to the cache portion of the fast memory.

10. The at least one non-transitory computer readable storage medium of claim 9, wherein the set of instructions, which when executed by the computing device, cause the computing device further to:
receive a request to allocate an additional portion of the fast memory to the graphics portion of the fast memory;
allocate the requested additional portion to the graphics portion of the fast memory in response to the request; and
initialize the newly allocated portion of the fast memory to a pre-determined state without reference to any contents of the main memory.

11. The at least one non-transitory computer readable storage medium of claim 10, wherein the pre-determined state comprises all zero values for the newly allocated portion of the fast memory.

12. The at least one non-transitory computer readable storage medium of claim 10, wherein the set of instructions, which when executed by the computing device, cause the computing device further to:
evict cache entries from the cache portion of the fast memory as needed to allocate the requested additional portion to the graphics portion.

* * * * *